United States Patent
Barnes

(10) Patent No.: US 9,849,818 B2
(45) Date of Patent: Dec. 26, 2017

(54) DEPLOYABLE TABLE APPARATUS

(71) Applicant: Jaguar Land Rover Limited, Coventry (GB)

(72) Inventor: Ian Barnes, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/032,355

(22) PCT Filed: Oct. 28, 2014

(86) PCT No.: PCT/EP2014/073119
§ 371 (c)(1),
(2) Date: Apr. 27, 2016

(87) PCT Pub. No.: WO2015/063084
PCT Pub. Date: May 7, 2015

(65) Prior Publication Data
US 2016/0272098 A1      Sep. 22, 2016

(30) Foreign Application Priority Data

Oct. 28, 2013   (GB) .................................. 1319017.8

(51) Int. Cl.
*A47B 23/00* (2006.01)
*B60N 3/00* (2006.01)
(Continued)

(52) U.S. Cl.
CPC ............. *B60N 3/001* (2013.01); *B60N 3/002* (2013.01); *B60N 3/102* (2013.01); *B60R 11/02* (2013.01);
(Continued)

(58) Field of Classification Search
CPC ....................................................... B60N 3/002
(Continued)

(56) References Cited

U.S. PATENT DOCUMENTS 5,179,447 A      1/1993   Lain
2002/0003361 A1*  1/2002   Duerr .................. B60N 2/4606
                                                    297/147
(Continued)

FOREIGN PATENT DOCUMENTS

DE      40 23 105 A1   8/1991
DE      100 31 700 A1  1/2002
(Continued)

OTHER PUBLICATIONS

Combined Search and Examination Report, GB 1319017.8, dated May 7, 2014, 6 pages.
(Continued)

*Primary Examiner* — Matthew Ing
(74) *Attorney, Agent, or Firm* — Myers Bigel, P.A.

(57) ABSTRACT

A deployable table apparatus for a vehicle includes a support arm and a carrier member. The carrier member is mounted to the support arm and is movable between a retracted position and an extended position. A table is mounted to the carrier member and is pivotable between a first position suitable for stowage and a second position suitable for use. A biasing mechanism is provided for biasing the carrier member towards the extended position. Movement of the carrier member from the extended position to the retracted position is inhibited when the table is in the second position. Pivoting the table to the second position is inhibited when the carrier member is in the retracted position.

20 Claims, 8 Drawing Sheets

(51) Int. Cl.
*B60N 3/10* (2006.01)
*B60R 11/02* (2006.01)
*B60R 11/00* (2006.01)

(52) U.S. Cl.
CPC ............ *B60R 11/0252* (2013.01); *B60N 3/10* (2013.01); *B60R 2011/0007* (2013.01); *B60R 2011/008* (2013.01); *B60R 2011/0082* (2013.01)

(58) Field of Classification Search
USPC .... 108/42, 44; 297/135, 144, 145, 147, 173, 297/174 R, 115, 154
See application file for complete search history.

(56) References Cited

U.S. PATENT DOCUMENTS

| | | | |
|---|---|---|---|
| 2004/0056160 A1 | 3/2004 | Smallhorn | |
| 2005/0012375 A1 | 1/2005 | Giasson | |
| 2006/0013677 A1* | 1/2006 | Oh | A47B 51/00 414/288 |
| 2006/0075941 A1* | 4/2006 | Seidl | A47B 9/02 108/102 |
| 2006/0220425 A1 | 10/2006 | Becker et al. | |
| 2008/0250983 A1* | 10/2008 | Sundarrao | A47B 3/00 108/44 |
| 2012/0049585 A1 | 3/2012 | Kim et al. | |
| 2012/0133180 A1 | 5/2012 | Moulton et al. | |
| 2013/0082492 A1* | 4/2013 | Andersson | B60N 2/468 297/188.17 |

FOREIGN PATENT DOCUMENTS

| | | |
|---|---|---|
| DE | 10 2011 103 614 A1 | 2/2012 |
| EP | 1 160 125 A2 | 12/2001 |
| FR | 2 832 676 A1 | 5/2003 |
| FR | 2 907 065 A3 | 4/2008 |
| WO | WO 2004/005069 A1 | 1/2004 |
| WO | WO 2008/046040 A2 | 4/2008 |

OTHER PUBLICATIONS

Notification of Transmittal of the International Search Report and the Written Opinion, PCT/EP2014/073119, dated Feb. 5, 2015, 12 pages.

Patents Act 1977: Examination Report under Section 18(3), GB Application No. GB1319017.8, dated Dec. 12, 2016, 5 pp.

* cited by examiner

DEPLOYABLE TABLE APPARATUS

RELATED APPLICATIONS

This application is a 35 U.S.C. §371 national stage application of PCT Application No. PCT/EP2014/073119, filed on Oct. 28, 2014, which claims priority from Great Britain Patent Application No. 1319017.8 filed on Oct. 28, 2013, the contents of which are incorporated herein by reference in their entireties. The above-referenced PCT International Application was published in the English language as International Publication No. WO 2015/063084 A1 on May 7, 2015.

TECHNICAL FIELD

The present invention relates to a deployable table apparatus for a vehicle; and to a vehicle incorporating a deployable table apparatus.

BACKGROUND OF THE INVENTION

It is known to provide deployable tables which can, for example, be stowed in an armrest of an aircraft seat. These types of tables are typically manually deployed by first pivoting the table about a front pivot to raise it out of the armrest. The table is then pivot laterally to extend across the front of the seat. Known deployable tables require that the table and the associated apparatus are lifted manually by the user, for example to lift the table out of the armrest. Since the apparatus is typically stowed in the armrest immediately adjacent to the user, accessing and manually lifting the table can prove difficult. This limitation may render known designs unsuitable for heavier assemblies, for example those intended to provide a fixed table when deployed. This may present a particular problem in certain applications, such as luxury motor vehicles.

At least in certain embodiments, the present invention sets out to overcome or ameliorate at least some of the problems associated with known deployable tables.

SUMMARY OF THE INVENTION

Aspects of the present invention relate to a deployable table apparatus for a vehicle; and to a vehicle incorporating a deployable table apparatus.

According to a further aspect of the present invention there is provided a deployable table apparatus for a vehicle, the deployable table apparatus comprising:
   a support arm;
   a carrier member mounted to the support arm and movable between a retracted position and an extended position; and
   a table mounted to the carrier member and pivotable between a first position suitable for stowage and a second position suitable for use;
   wherein a biasing means is provided for biasing the carrier member towards said extended position. Since the table is mounted to the carrier member, the force required to displace the carrier member to its extended position may be relatively high. Moreover, the user's movement may be inhibited if they are seated when they attempt to deploy the carrier member. The biasing means can assist the user in displacing the carrier member to its extended position, thereby facilitating deployment of the table. In certain embodiments, the biasing means could deliver sufficient force to lift the carrier member to said extended position without input from the user. However, it is envisaged that the biasing means would typically operate to assist the user in displacing the carrier member from its retracted position to its extended position.

The biasing means can comprise a spring element. The spring element can, for example, be disposed in said support arm. The biasing means can comprise a constant force spring. The constant force spring can deliver a uniform force irrespective of the position of the carrier member in relation to the support arm. This facilitates control of the carrier member as it is displaced to said extended position. Alternatively, the biasing means can comprise a spring motor. The spring motor can output an assistive force to facilitate lifting the carrier member. The spring motor can drive a toothed belt which is coupled to the carrier member. The spring motor can, for example, drivingly rotate a toothed pinion gear which cooperates with the toothed belt to deliver the assistive force to the carrier member.

The movement of the carrier member from said extended position to said retracted position can be inhibited when the table is in said second position. The carrier member can be movable from said extended position to said retracted position only when the table is in said first position.

The movement of the table from said first position to said second position can be inhibited when the carrier member is in said retracted position. The table can be pivotable to said second position only when the carrier member is in said extended position.

The carrier member can be movably mounted to a first side of the support arm in a side-by-side arrangement. The table can be positioned across or over an end of the support arm when it is in said second position. Thus, the table can extend outwardly from a second side of the support arm (opposite to the first side thereof) when it is in said second position. The side-by-side arrangement of the carrier member and the support arm can retain the table in said first position until the carrier member is in said extended position.

According to a further aspect of the present invention there is provided a deployable table apparatus for a vehicle, the deployable table apparatus comprising:
   a support arm;
   a carrier member mounted to the support arm and movable between a retracted position and an extended position; and
   a table mounted to the carrier member and pivotable between a first position suitable for stowage and a second position suitable for use;
   wherein the carrier member is movable from said extended position to said retracted position only when the table is in said first position. The movement of the carrier member from said extended position to said retracted position can be inhibited when the table is in said second position.

The carrier member can be movable between said retracted position and said extended position along a first longitudinal axis. The first longitudinal axis can be arranged substantially parallel to a longitudinal axis of the support arm. The table can have a second longitudinal axis. The first and second longitudinal axes can be arranged substantially coincident with (or parallel to) each other when the table is in said first position. The first and second longitudinal axes can arranged substantially perpendicular to each other when the table is in said second position.

The table travels with the carrier member when displaced from said extended position to said retracted position. The table can be arranged substantially vertically in said first position and substantially horizontally in said second position.

As outlined above, the carrier member can be mounted to the first side of the support arm in a side-by-side arrangement. The table can be pivotable to said second position only when the carrier member is in said extended position. The side-by-side arrangement of the carrier member and the support arm can retain the table in said first position until the carrier member is in said extended position. Thus, movement of the table from said first position to said second position can be inhibited when the carrier member is in said retracted position.

According to a further aspect of the present invention there is provided a deployable table apparatus for a vehicle, the deployable table apparatus comprising:
 a support arm;
 a carrier member mounted to the support arm and movable between a retracted position and an extended position; and
 a table mounted to the carrier member and pivotable between a first position suitable for stowage and a second position suitable for use;
 wherein the table is pivotable to said second position only when the carrier member is in said extended position.

The carrier member can comprise a coupling for mounting the table. The coupling can be displaced beyond a distal (free) end of the support arm when the carrier member moves from said retracted position to said extended position. Only once the coupling is positioned beyond the distal end of the support arm can the table be pivoted to said second position.

The table can pivot over the distal end of the support arm. A portion of an underside of the table can abut the support arm when the table is in said second position. The carrier member can be mounted to the first side of the support arm and the table can pivots towards the second side of the support arm (opposite to the first side) when displaced from said first position to said second position.

A biasing means can be provided for biasing the carrier member towards said extended position. A damping mechanism can be provided for controlling movement of the table from said first position to said second position; and/or from said second position to said first position.

The support arm can be rotatable between a deployed position and a stowed position. A deployment means can be provided for rotating the support arm from said stowed position to said deployed position. The deployment means can comprise an electric drive machine. A control unit can be provided for controlling operation of the electric machine. The control unit can be configured to rotate the support arm from said deployed position to said stowed position only when the carrier member is in said retracted position. The control unit can be operated in response to a signal received from a control panel.

The table can comprise a first portion and a second portion. The second portion of the table can be movable laterally relative to the first portion. For example, the second portion can translate along at least one guide member. A damping means can be provided for controlling the movement of the second portion relative to the first portion. The damping means can comprise a viscous damper.

According to a still further aspect of the present invention there is provided a vehicle comprising a deployable table apparatus as described herein. The deployable table apparatus can be installed in a centre console in the vehicle.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying Figures, in which.

DETAILED DESCRIPTION OF AN EMBODIMENT

A deployable table apparatus 1 for deploying a table 3 in accordance with an embodiment of the present invention will now be described with reference to the accompanying Figures.

Figure 1:
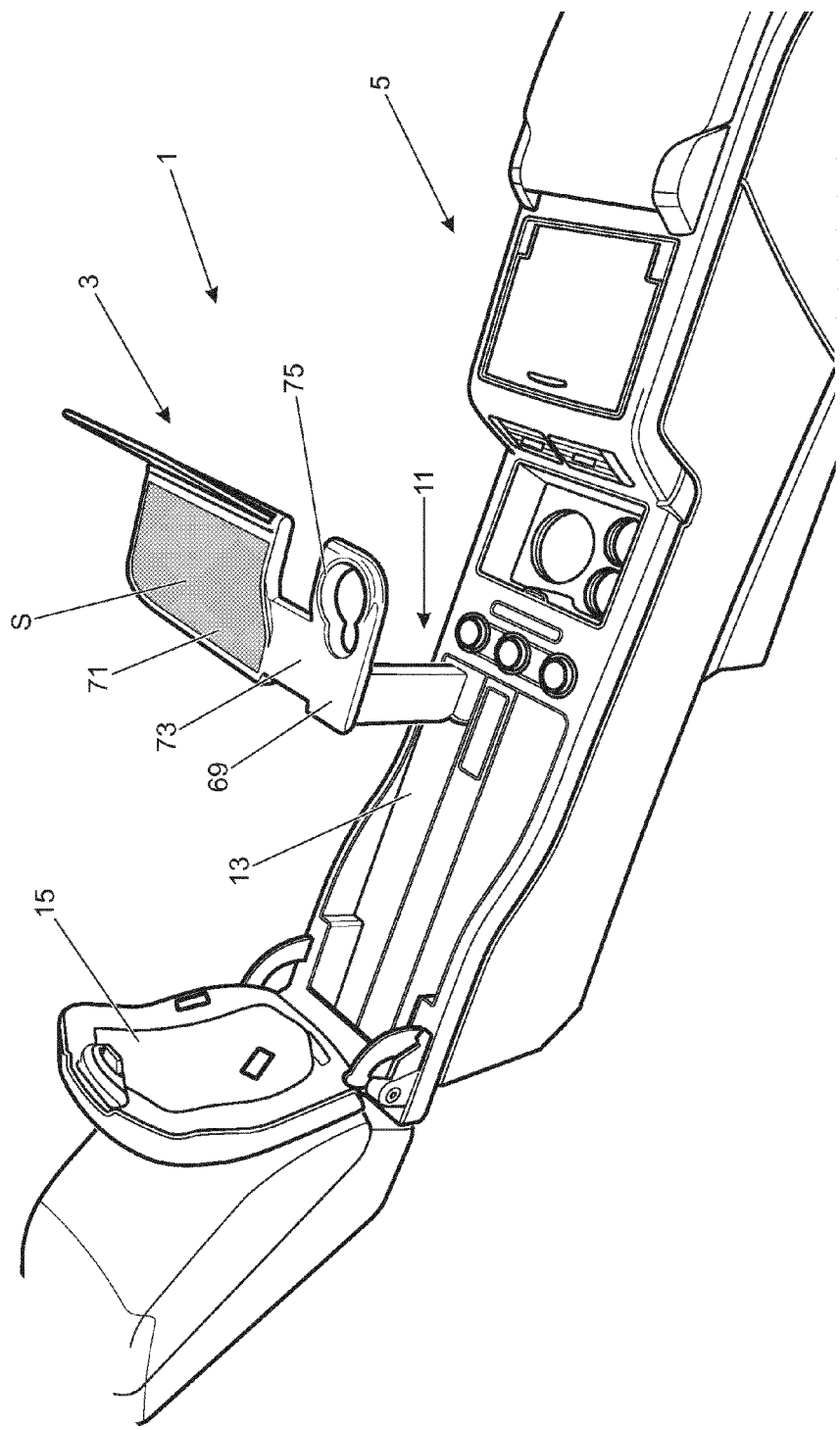
FIG. 1 shows a centre console for a back seat of a vehicle incorporating a deployable table in accordance with an embodiment of the present invention.
Figure 2:
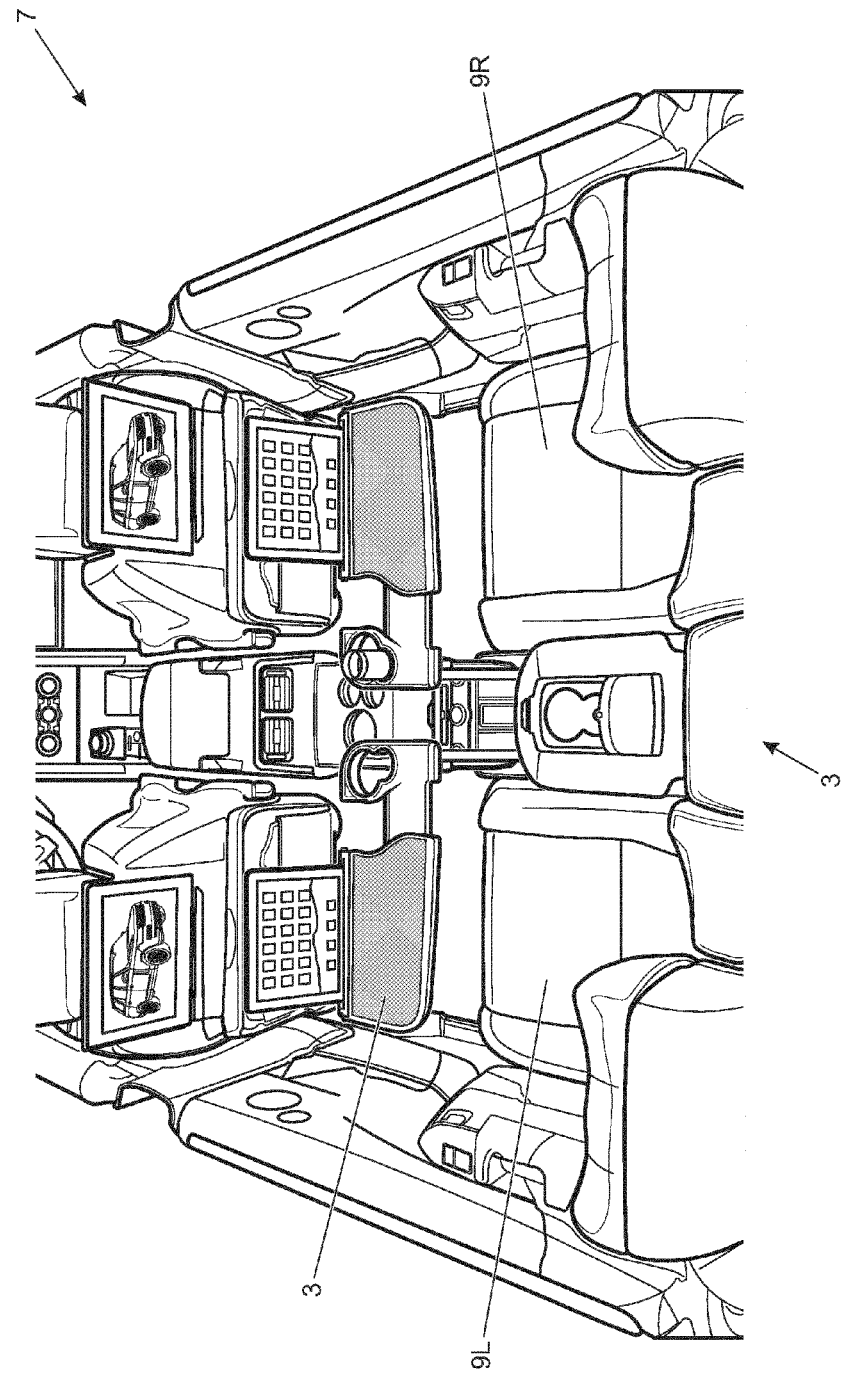
FIG. 2 shows a view of the interior of the vehicle cabin with the table shown in FIG. 1 in a deployed position.

In the present embodiment the apparatus 1 is provided in a centre console 5 of a vehicle 7, as shown in FIGS. 1 and 2. The centre console 5 is positioned in the vehicle cabin between left and right rear seats 9L, 9R. The apparatus 1 is arranged to displace the table 3 between a stowed position in the centre console 5 and a deployed position for use.

Figure 3A:
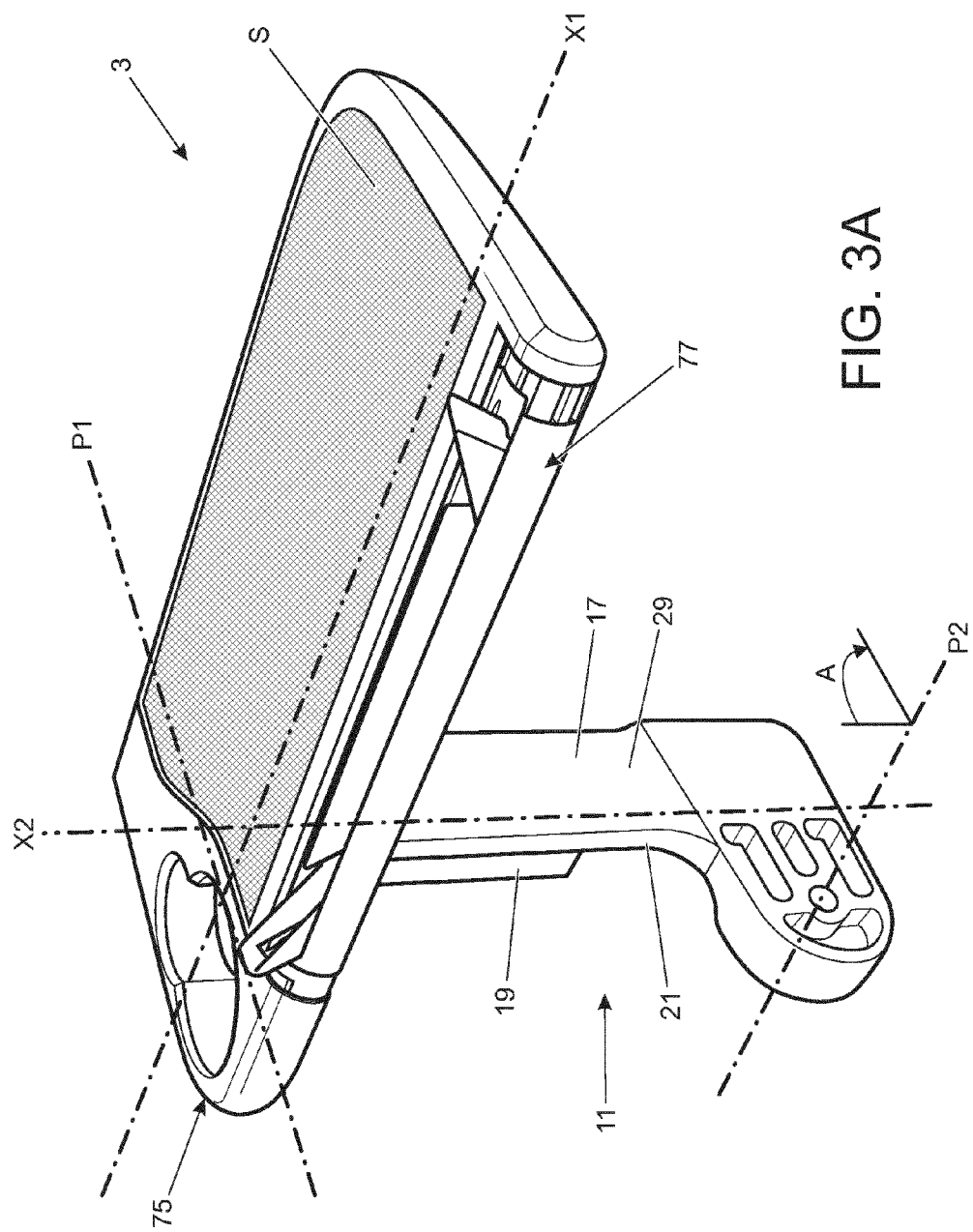
FIGS. 3A and 3B show perspective views of the deployable table shown in FIG. 1 in first and second configurations.
Figure 3B:
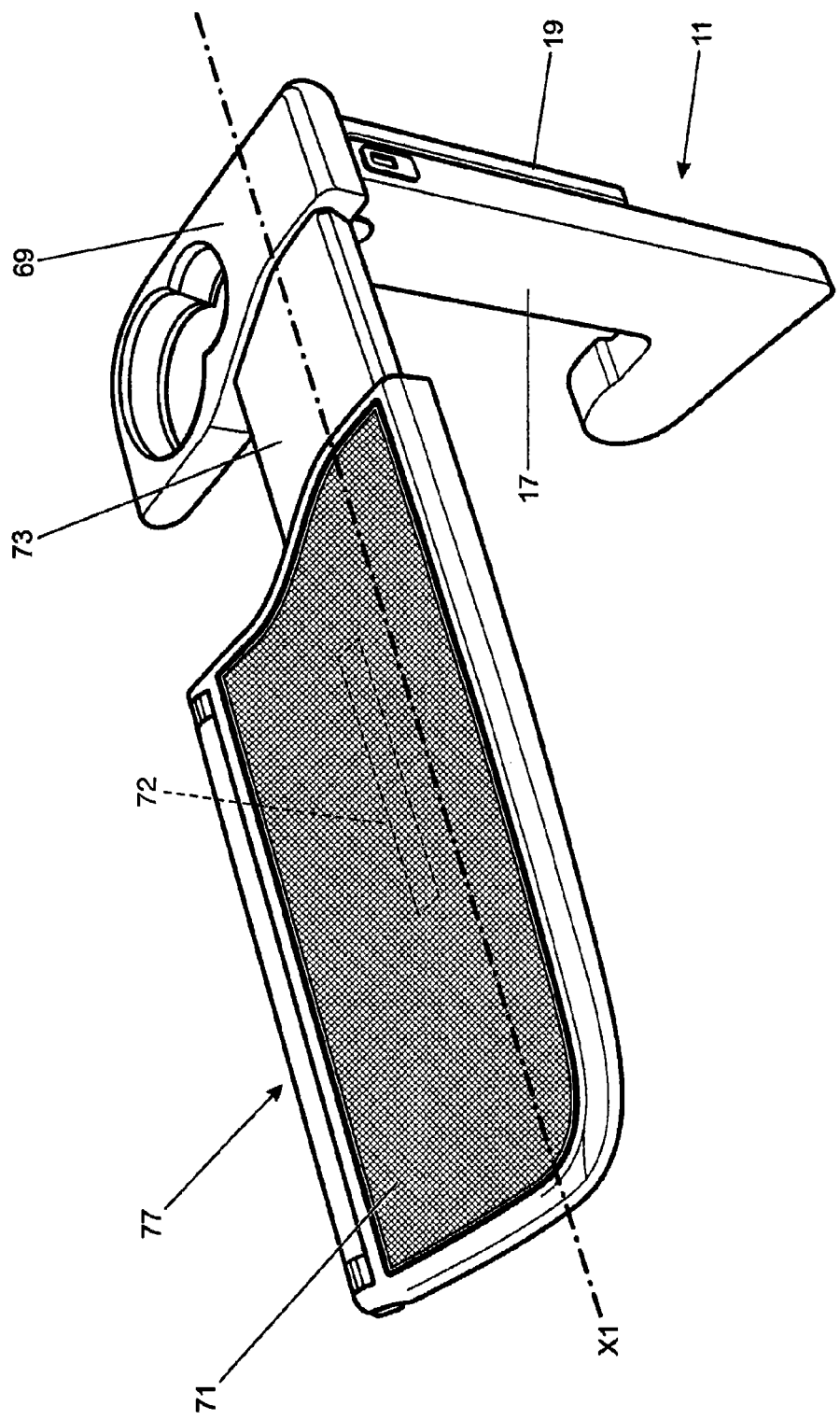

As shown in FIGS. 3A and 3B, the table 3 is mounted to an extendable arm 11. The extendable arm 11 is rotatably mounted to the centre console 3. In its stowed position, the table 3 is received in a chamber 13 formed in the centre console 5. In the deployed position (shown in FIGS. 1 and 2), the table 3 extends transversely across an adjacent seat 9L for use by an occupant of the vehicle 7. As shown in FIG. 2, a table 3 can be provided on each side of the vehicle 7. The left and right tables have the same configuration and can be operated independently of each other. For the sake of brevity, only the left-hand table 3 will be described herein.

A central armrest 15 is pivotally mounted to the centre console 5 and can be folded down to its operative position when the table 3 is in either its stowed position or its deployed positions. The chamber 13 is covered by front and rear panels (not shown) which can be opened by an electric drive motor operating a rack and pinion drive (not shown). The front and rear panels follow an arcuate guide track as they open and close. The front panel is a slave to the rear panel and remains open when the extendable arm 11 is deployed.

The extendable arm 11 comprises a support arm 17 and a carrier member 19. The carrier member 19 is slidably mounted to the support arm 17 and can undergo translation along a longitudinal axis X2 of the support arm 17 to extend or retract the extendable arm 11. The carrier member 19 is mounted on a first side 21 of the support arm 15 which is disposed towards a centre line of the vehicle 7.

The table 3 has a working surface S which is substantially planar. In the present embodiment, the table 3 is machined from aluminium. As described herein, a biasing mechanism 23 is provided in the support arm 19 to deliver a mechanical force to assist the user when lifting the table 3 and the carrier member 19 relative to the support arm 17. A stop (not shown) is provided on the support arm 17 to limit the displacement of the carrier member 19 relative to the support arm 17.

A pivoting coupling 27 is provided at an upper end of the carrier member 19 for pivotally mounting the table 3. The pivoting coupling 27 defines a first pivot axis P1 about which the table 3 can pivot between a first position for stowage and a second position ready for use. The longitudinal axis X1 of the table 3 is substantially perpendicular to the first pivot axis. In relation to the support arm 17, the longitudinal axis X1 of the table 3 is disposed substantially parallel to the longitudinal axis X2 in said first position, and substantially perpendicular to the longitudinal axis X2 in said second position. The pivoting coupling 27 accommodates a pivoting movement of approximately 90° about said first pivot axis P1. A damping mechanism can optionally be provided to control the speed at which the table 3 pivots from said first position to said position. The damping mechanism can, for example, comprise a spring, a piston or a gas strut. The damping mechanism can be incorporated into the pivoting coupling 27.

The pivoting coupling 27 is arranged such that the table 3 pivots over the support arm 17 when it is pivoted from said first position to said second position. Consequently, the table 3 extends outwardly from a second side 29 of the support arm 15 (opposite to the first side 21) when it is in its second position. A support platform 31 formed on an underside of the table 3 for engaging an upper contact surface 33 of the support arm 17 when the table 3 is in this second position. The support arm 17 thereby provides additional support for the table 3 when it is deployed and may help avoid over-articulation of the pivoting coupling 27. It will be appreciated that the support arm 17 also functions to inhibit pivoting of the table 3 until the carrier member 19 is in its uppermost position. Thus, the table 3 can pivot to an operative position only when the carrier member 19 is in its extended position. A latching mechanism (not shown) is optionally provided in the support arm 19 to lock the table 3 in its second position.

The extendable arm 11 is made of aluminium and comprises a foot portion 35. As described in more detail below, the foot portion 35 is pivotally mounted to a support assembly 37 located in the centre console 5. The foot portion 35 defines a second pivot axis P2 which extends transversely across the vehicle 7. An arrow A shown in FIG. 3 illustrates the pivoting movement of the support arm 11 through approximately 90° about said second pivoting axis P2. The support arm 11 is pivoted backwards (i.e. towards the rear of the vehicle 7) when the table 3 is stowed.

Figure 4:
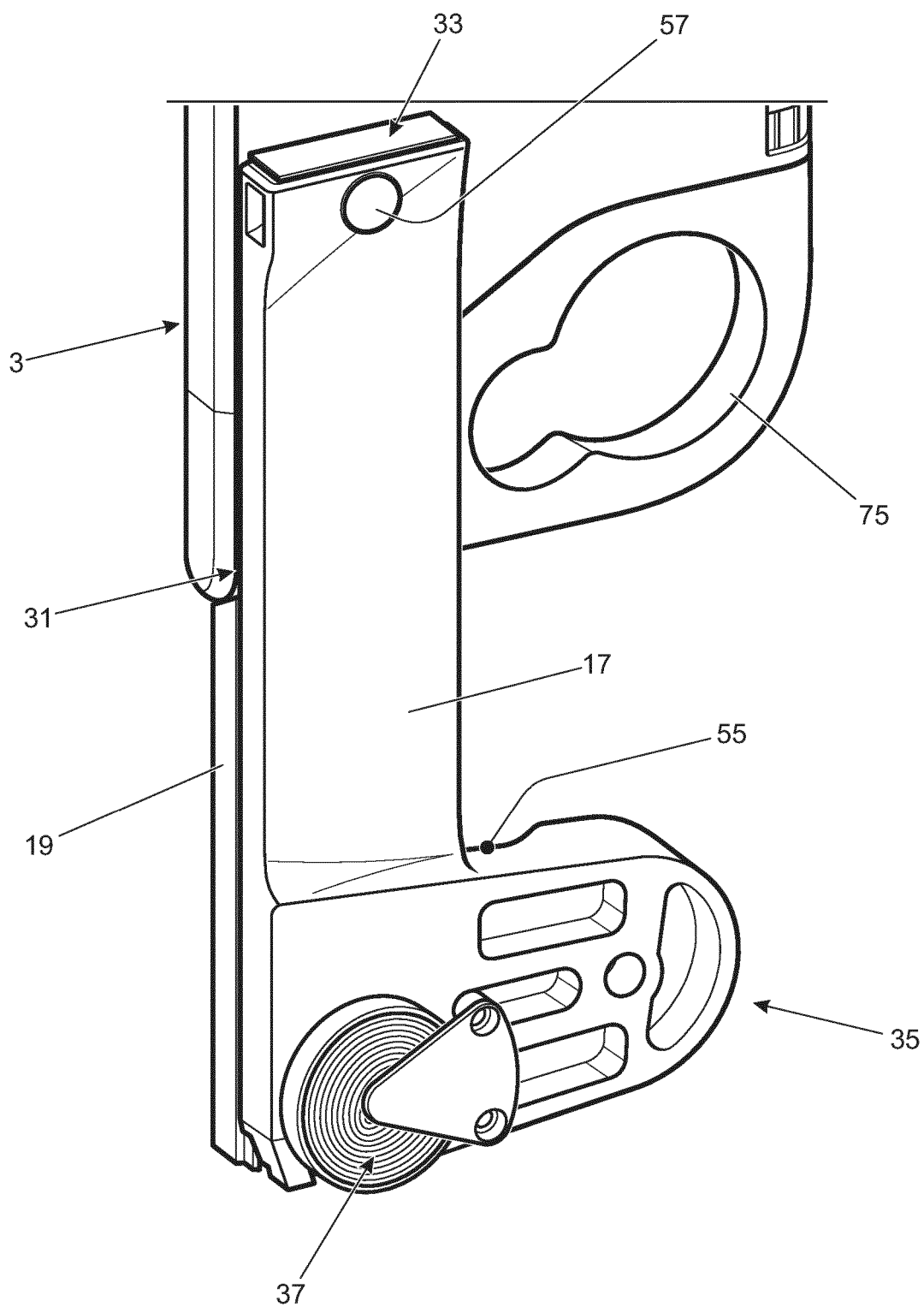
FIG. 4 shows a perspective view of the operating mechanism for the deployable table shown in FIG. 1 in a retracted position.
Figure 6:
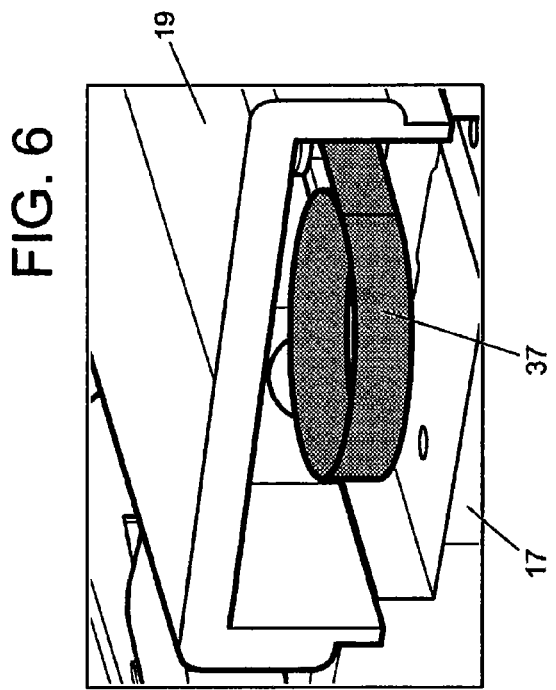
FIG. 6 shows a perspective view of the table carrier member mounted to the support arm shown in FIG. 4.
Figure 5:
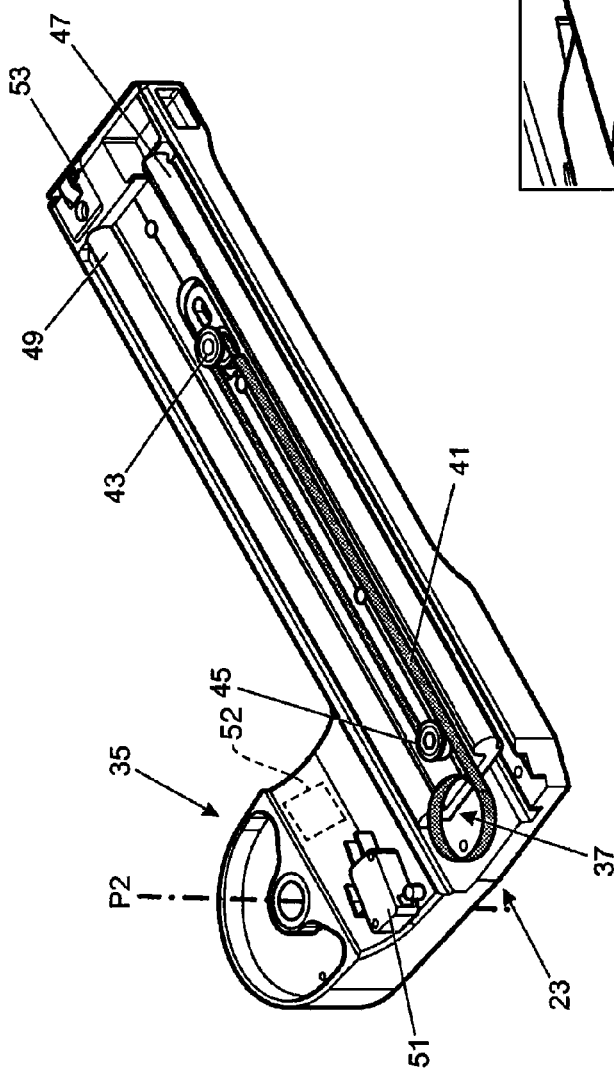
FIG. 5 shows a partial assembly view of the support arm for the deployable table shown in FIG. 1.

The biasing mechanism 23 provides a force to assist with lifting the carrier member 19 as the table 3 is deployed. With reference to FIGS. 4, 5 and 6, the biasing mechanism 23 comprises a spring motor (denoted generally by the reference numeral 37) drivingly connected to a lower toothed belt pinion 45 by a through shaft. The lower toothed belt pinion 45 drivingly engages a toothed belt 41 to provide the assisting force. The toothed belt 41 extends vertically and is supported at its upper end by an upper belt pinion 43. The toothed belt 41 is clamped to the carrier member 19. As the carrier member 19 is lifted, the spring motor 37 drivingly rotates the lower toothed belt pinion 45 which drives the toothed belt 41 and applies a force to the toothed belt 41 which acts to lift the carrier member 19 and the table 3. The spring motor 37 is preloaded (wound) by the action of pushing the carrier member 19 back into its stowed position at the bottom of the support arm 17. The toothed belt 41 can be wound onto a spindle (not shown) provided at the bottom of the support arm 11. The spring motor 37 in the present embodiment can deliver an assistive force of approximately 7N to assist with lifting the carrier member 19 and the table 3. With reference to FIG. 5, the support arm 17 is slidably mounted on first and second guide rails 47, 49 provided in the support arm 17. A damping mechanism could optionally be provided for controlling the lifting and/or lowering of the carrier member 19.

A first electrical switch 51 is provided in the foot portion 35 to output a first signal when the support arm 11 has rotated to its upright position. A second electrical switch 53 is provided at the top of the support arm 11 to output a second signal when the carrier member 19 reaches the uppermost position in its travel. The first and second signals are output from the respective first and second switches 51, 53 to an electronic control unit 52. An assist mechanism release button 55 can optionally be provided in the support arm 17 to release the assist mechanism 23. A table release button 57 is provided at the top of the support arm 17 to release the latching mechanism which locks the table 3 its second position.

Figure 7A:
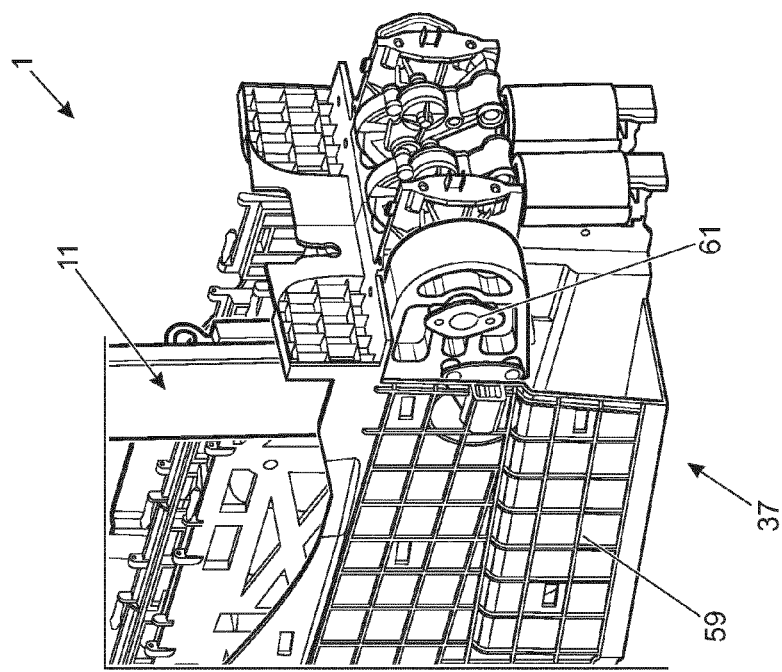
FIGS. 7A and 7B show a partial assembly views of the support arm in a retracted position and in a deployed position.
Figure 7B:
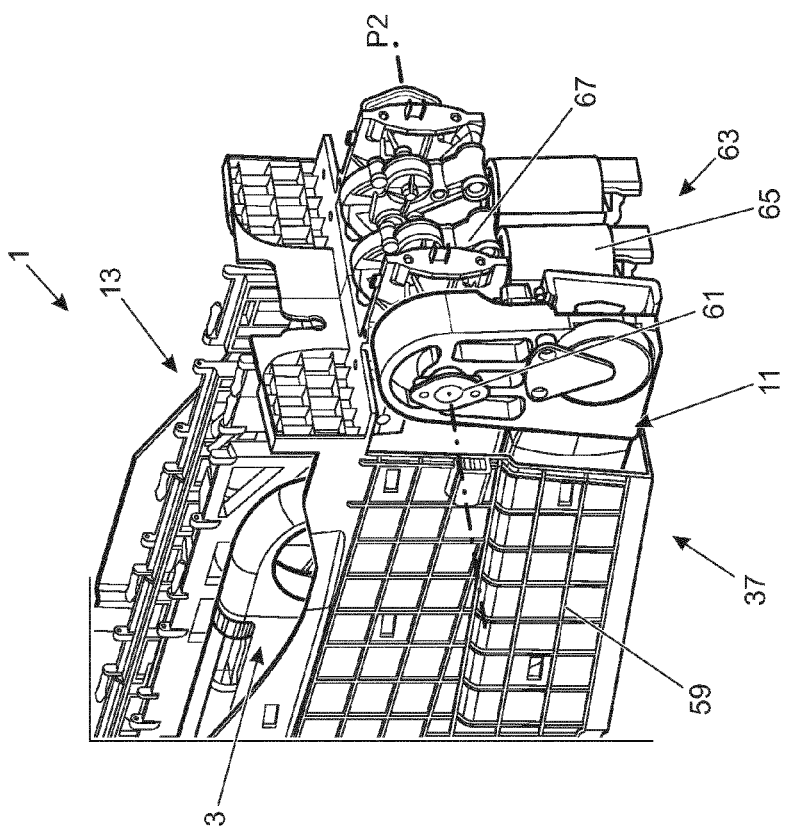

The foot portion 35 of the support arm 11 is pivotally mounted to the support assembly 37. As shown in FIGS. 7A and 7B, the support assembly 37 comprises a housing 59 which supports a pivot pin 61 which defines the second pivot axis P2. A deployment mechanism 63 is provided to rotate the support arm 17 about the pivot pin 61. The deployment mechanism 63 comprises an electric motor 65 coupled to the support arm 17 via a gearbox 67. The table 3 is shown in a stowed position in FIG. 7A and in a deployed position in FIG. 7B. The electric motor 65 is controlled by the electronic control unit 52 connected to the first and second electrical switches 51, 53 (FIG. 5). It will be appreciated from FIGS. 7A and 7B that separate deployment actuator 63 are provided for each table 3 and can be operated independently of each other.

In the present embodiment the table 3 is divided into first and second sections 69, 71. The first section 69 is coupled to the pivoting coupling 27 mounted to said carrier member 19. The second section 71 is slidably mounted on a cantilever member 73, supported by the first section 69, extending parallel to the longitudinal X1 of the table 3. The second section 71 can be manually displaced along said cantilever member 73 for positioning directly in front of the seat occupant, as shown most clearly in FIG. 3B. The cantilever member 73 can be replaced with one or more bearing rods. A damping mechanism 72 is provided in the second section 71 to control the deployment speed. The damping mechanism 72 can, for example, comprise a rotary viscous damper cooperating with a toothed rack coupled to the second section 71. The cantilever member 73 comprises first and second detents for cooperating with a spring biased member (such as a ball bearing) to delimit the travel of the second section 71 in each direction.

A cup-holder 75 is formed in the first section 69 of the table 3. Furthermore, the second section 71 comprises a support device 77 for supporting a tablet computer (not shown). The support device 77 is the subject of a separate application entitled "SUPPORTING DEVICE" filed on the same date as the present application by the Applicant. The contents of this application are incorporated herein in their entirety by reference. The table 3 also comprises a universal serial bus (USB) port (not shown) for connecting the tablet computer to on-board systems.

Figure 8B:
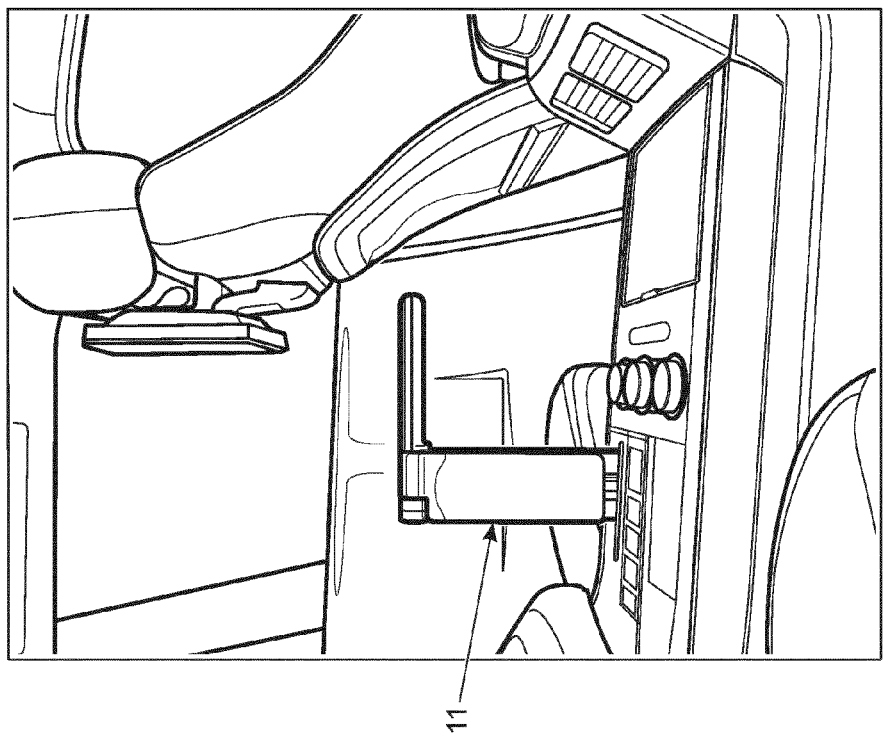
FIGS. 8A and 8B show the table in an intermediate position and in a final deployed position.
Figure 8A:
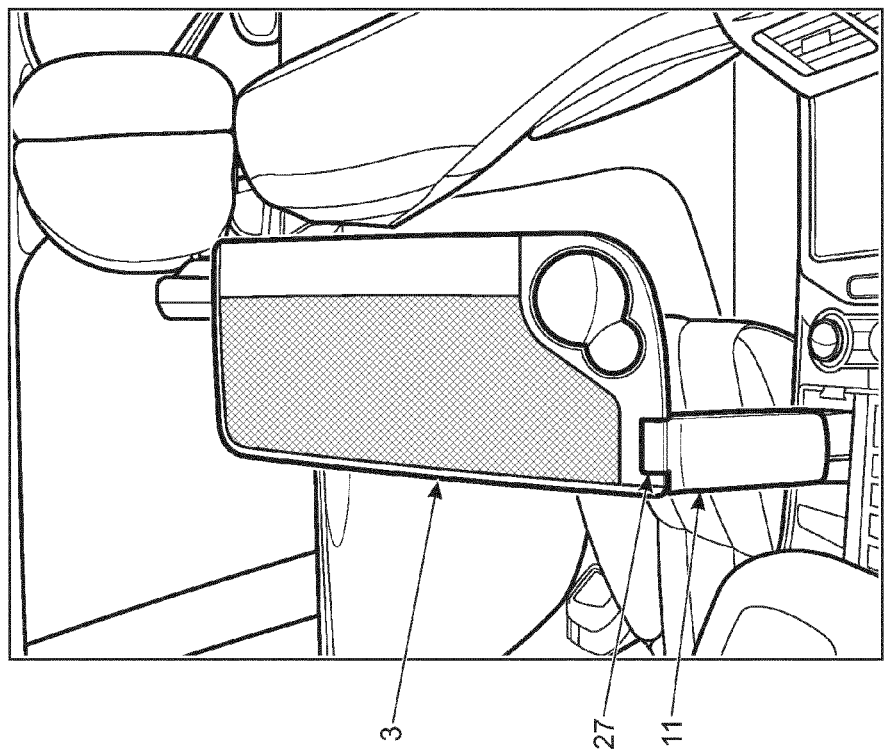

The deployment of the table 3 will now be described with reference to FIGS. 8A and 8B. The table 3 is initially stowed in the chamber 13 within the centre console 5 of the vehicle 7. In its stowed configuration, the longitudinal axis X1 of the table 3 is arranged substantially parallel to the longitudinal axis X2 of the support arm 17 such that the working surface S is arranged in an upright position. To initiate the deployment of the table 3, the user lifts the centre armrest 15 and presses a deployment button (not shown). The front and rear closure panels are displaced to open the chamber 13. The deployment mechanism 63 is then activated to rotate the support arm 17 from its horizontal stowed position (shown in FIG. 7A) to its vertical deployed position (shown in FIG. 7B). The rotation of the support arm 17 displaces the table 3 to an upright position within the vehicle cabin 5, as shown in FIG. 8A. The carrier member 19 is retracted when the support arm 17 is initially deployed.

The user then depresses the release button 55 and lifts the table 3 and the carrier member 19 vertically relative to the support arm 17. The spring motor 37 of the biasing mechanism 23 deliver an assistive force to help the user complete this process. The presence of the support arm 17 inhibits rotation of the table 3 about the first pivot axis P1. Only once the carrier member 19 has reached the top of its travel can the table 3 pivot about the first pivot axis P1 from its first position to its second position, as shown in FIG. 8B. The working surface S is arranged in a substantially horizontal position when the table 3 is in said second position. The support platform 31 on the underside of the table 3 engages the contact surface 33 of the support arm 17 when the table 3 is in this second position. The pivoting action of the table 3 is performed under its own weight. The second section 71 of the table 3 can then optionally be displaced in a lateral direction by sliding it along the cantilever member 73.

In order to stow the table 3, the table 3 is rotated from its second position to its first position. The table 3 and the carrier member 19 are then displaced downwardly, thereby recharging the spring motor 37. The table 3 is then locked in position by the latching mechanism to prevent redeployment. The user then lifts the armrest 15 and depresses a table stow button.

The electric motor 65 operates to rotate the extendable arm 11 back to its stowed position while the table stow button is depressed. If the table stow position is released, the electric motor 65 is deactivated to inhibit further movement of the extendable arm 11. Thus, releasing the table stow button halts movement of the extendable arm 11, thereby helping to prevent objects being trapped by the extendable arm 11. Equally, operation of the electric motor 65 is inhibited if the table 2 is not folded properly into said second position, as determined by the second switch 53. Once the extendable arm 11 is in its stowed position, the front and rear closure panels are returned to their closed position automatically. The user then lowers the centre armrest 15.

It will be appreciated that various changes and modifications can be made to the apparatus described herein. For example, alternate drive mechanisms could be provided to raise the carrier member 19 and the table 3. Alternate drive mechanisms include a spring motor assist mechanism; or a gas strut assist mechanism. Indeed, rather than assisting the user, the drive mechanism could be configured to lift the carrier member 19 and the table 3. A spring motor lift mechanism or a cash strapped lift mechanism could be provided to perform this function. It will be appreciated that an electric drive motor could also be provided to assist or lift the carrier method 19 and the table 3.

A further modification would be to replace the support arm 17 and carrier member 19 with a telescopic arm.

Further aspects of the present invention are set out in the following numbered paragraphs:

1. A deployable table apparatus for a vehicle, the deployable table apparatus comprising:
   a support arm;
   a carrier member mounted to the support arm and movable between a retracted position and an extended position; and
   a table mounted to the carrier member and pivotable between a first position suitable for stowage and a second position suitable for use;
   wherein a biasing means is provided for biasing the carrier member towards said extended position.

2. A deployable table apparatus as described in paragraph 1, wherein the biasing means comprises a spring element disposed in said support arm.

3. A deployable table apparatus as described in paragraph 2, wherein the biasing means comprises a spring motor coupled to said carrier member.

4. A deployable table apparatus as described in paragraph 1, wherein the carrier member is movable from said extended position to said retracted position only when the table is in said first position.

5. A deployable table apparatus for a vehicle, the deployable table apparatus comprising:
   a support arm;
   a carrier member mounted to the support arm and movable between a retracted position and an extended position; and
   a table mounted to the carrier member and pivotable between a first position suitable for stowage and a second position suitable for use;
   wherein the carrier member is movable from said extended position to said retracted position only when the table is in said first position.

6. A deployable table apparatus as described in paragraph 5, wherein the carrier member is movable between said retracted position and said extended position along a first longitudinal axis.

7. A deployable table apparatus as described in paragraph 6, wherein the table has a second longitudinal axis, the first and second longitudinal axes being arranged substantially coincident with each other when the table is in said first position.

8. A deployable table apparatus as described in paragraph 7, wherein the first and second longitudinal axes are arranged substantially perpendicular to each other when the table is in said second position.

9. A deployable table apparatus as described in paragraph 1, wherein the table is arranged substantially vertically in said first position and substantially horizontally in said second position.

10. A deployable table apparatus as described in paragraph 1, wherein the table is pivotable to said second position only when the carrier member is in said extended position.

11. A deployable table apparatus for a vehicle, the deployable table apparatus comprising:
  a support arm;
  a carrier member mounted to the support arm and movable between a retracted position and an extended position; and
  a table mounted to the carrier member and pivotable between a first position suitable for stowage and a second position suitable for use;
  wherein the table is pivotable to said second position only when the carrier member is in said extended position.

12. A deployable table apparatus as described in paragraph 11, wherein the carrier member comprises a coupling for mounting the table, the coupling being displaced beyond a distal end of the support arm when the carrier member moves from said retracted position to said extended position.

13. A deployable table apparatus as described in paragraph 1, wherein a portion of an underside of the table abuts the support arm when the table is in said second position.

14. A deployable table apparatus as described in paragraph 5 comprising a biasing means for biasing the carrier member towards said extended position.

15. A deployable table apparatus as described in paragraph 1, wherein the support arm is rotatable between a deployed position and a stowed position.

16. A deployable table apparatus as described in paragraph 15, wherein deployment means is provided for rotating the support arm from said stowed position to said deployed position.

17. A deployable table apparatus as described in paragraph 16, wherein the deployment means comprises an electric machine coupled to a control unit, the control unit being configured to operate the electric machine to rotate the support arm from said deployed position to said stowed position only when the carrier member is in said retracted position.

18. A deployable table apparatus as described in paragraph 17, wherein the table comprises a first portion and a second portion, the second portion being movable laterally relative to the first portion.

19. A deployable table apparatus as described in paragraph 18 comprising a damping means for controlling the movement of the second portion relative to the first portion.

20. A vehicle comprising a deployable table apparatus as described in paragraph 19.

21. A vehicle as described in paragraph 20, wherein the deployable table apparatus is installed in a centre console in the vehicle.

The invention claimed is:

1. A deployable table apparatus for a vehicle, the deployable table apparatus comprising:
  a deployable support arm rotatable between a deployed position and a stowed position;
  a carrier member mounted to the support arm and movable between a retracted position and an extended position;
  a table mounted to the carrier member and pivotable between a first position suitable for stowage and a second position suitable for use, wherein the carrier member is movable from the extended position to the retracted position only when the table is in the first position; and
  a biasing mechanism in the support arm that is configured to urge the carrier member towards the extended position.

2. The deployable table apparatus of claim 1, wherein the carrier member is movable between the retracted position and the extended position along a first longitudinal axis, wherein the table has a second longitudinal axis, and wherein the first and second longitudinal axes are arranged substantially coincident with each other when the table is in the first position.

3. The deployable table apparatus of claim 2, wherein the first and second longitudinal axes are arranged substantially perpendicular to each other when the table is in the second position.

4. The deployable table apparatus of claim 1, wherein the table is arranged substantially vertically in the first position and substantially horizontally in the second position.

5. The deployable table apparatus of claim 1, wherein the table is pivotable to the second position only when the carrier member is in the extended position, and wherein the carrier member comprises a coupling for mounting the table, the coupling being displaced beyond a distal end of the support arm when the carrier member moves from the retracted position to the extended position.

6. The deployable table apparatus of claim 1, wherein the biasing mechanism comprises a spring element disposed in the support arm.

7. The deployable table apparatus of claim 6, wherein the biasing mechanism comprises a spring motor coupled to the carrier member.

8. The deployable table apparatus of claim 1, wherein a portion of an underside of the table abuts the support arm when the table is in the second position.

9. The deployable table apparatus of claim 1, further comprising a deployment mechanism configured to rotate the support arm from the stowed position to the deployed position.

10. The deployable table apparatus of claim 9, wherein the deployment mechanism comprises an electric machine coupled to a control unit, the control unit being configured to operate the electric machine to rotate the support arm from the deployed position to the stowed position only when the carrier member is in the retracted position.

11. The deployable table apparatus of claim 1, wherein the table comprises a first portion and a second portion, the second portion being movable laterally relative to the first portion, and further comprising a damping mechanism configured to control movement of the second portion relative to the first portion.

12. A deployable table apparatus for a vehicle, the deployable table apparatus comprising:
  a deployable support arm rotatable between a deployed position and a stowed position;
  a carrier member mounted to the support arm and movable between a retracted position and an extended position;
  a table mounted to the carrier member and pivotable between a first position suitable for stowage and a second position suitable for use; and
  a biasing mechanism in the support arm that is configured to urge the carrier member towards the extended position.

13. The deployable table apparatus of claim 12, wherein the biasing mechanism comprises a spring element and a spring motor coupled to the carrier member.

14. The deployable table apparatus of claim 13, wherein the carrier member is movable from the extended position to the retracted position only when the table is in the first position, wherein the carrier member is movable between the retracted position and the extended position along a first longitudinal axis, and wherein the table has a second longitudinal axis, the first and second longitudinal axes being arranged substantially coincident with each other when the table is in the first position.

15. The deployable table apparatus of claim 14, wherein the first and second longitudinal axes are arranged substantially perpendicular to each other when the table is in the second position.

16. The deployable table apparatus of claim 12, wherein the table is arranged substantially vertically in the first position and substantially horizontally in the second position, and wherein the table is pivotable to the second position only when the carrier member is in the extended position.

17. A deployable table apparatus for a vehicle, the deployable table apparatus comprising:
 a deployable support arm rotatable between a deployed position and a stowed position;
 a carrier member mounted to the support arm and movable between a retracted position and an extended position;
 a table mounted to the carrier member and pivotable between a first position suitable for stowage and a second position suitable for use, wherein the table is pivotable to the second position only when the carrier member is in the extended position; and
 a biasing mechanism in the support arm that is configured to urge the carrier member towards the extended position.

18. The deployable table apparatus of claim 17, wherein the carrier member comprises a coupling for mounting the table, the coupling being displaced beyond a distal end of the support arm when the carrier member moves from the retracted position to the extended position, wherein a portion of an underside of the table abuts the support arm when the table is in the second position.

19. The deployable table apparatus as claimed in claim 17, further comprising a deployment mechanism configured to rotate the support arm from the stowed position to the deployed position, and wherein the deployment mechanism comprises an electric machine coupled to a control unit, the control unit being configured to operate the electric machine to rotate the support arm from the deployed position to the stowed position only when the carrier member is in the retracted position.

20. The deployable table apparatus of claim 17, wherein the table comprises a first portion and a second portion, the second portion being movable laterally relative to the first portion, and further comprising a damping mechanism configured to control movement of the second portion relative to the first portion.

* * * * *